(12) United States Patent
Yoo et al.

(10) Patent No.: US 11,352,273 B2
(45) Date of Patent: Jun. 7, 2022

(54) HYDROGEN WATER GENERATOR

(71) Applicant: LG ELECTRONICS INC., Seoul (KR)

(72) Inventors: Hyun Sun Yoo, Seoul (KR); Joo Gyeom Kim, Seoul (KR); Jae Hung Chun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 97 days.

(21) Appl. No.: 16/578,618

(22) Filed: Sep. 23, 2019

(65) Prior Publication Data

US 2020/0361799 A1 Nov. 19, 2020

(30) Foreign Application Priority Data

May 14, 2019 (KR) .......................... 10-2019-0056360
Jul. 10, 2019 (KR) .......................... 10-2019-0083299

(51) Int. Cl.
*C02F 1/461* (2006.01)
*C02F 1/68* (2006.01)
*C25B 1/04* (2021.01)

(52) U.S. Cl.
CPC ............ *C02F 1/68* (2013.01); *C02F 1/46104* (2013.01); *C25B 1/04* (2013.01); *C02F 2201/46115* (2013.01)

(58) Field of Classification Search
None
See application file for complete search history.

(56) References Cited

U.S. PATENT DOCUMENTS

2020/0317541 A1* 10/2020 Park ..................... C25B 1/13

FOREIGN PATENT DOCUMENTS

| CN | 1186143 | A | 7/1998 | |
|---|---|---|---|---|
| CN | 206927702 | U | 1/2018 | |
| CN | 108677206 | A | 10/2018 | |
| CN | 109641767 | A | 4/2019 | |
| JP | 2017100113 | A | 6/2017 | |
| JP | 2017106094 | A | 6/2017 | |
| KR | 101033262 | B1 | 4/2011 | |
| KR | 20120121967 | A | 11/2012 | |
| KR | 101320463 | B1 | 10/2013 | |
| KR | 101427989 | B1 | 8/2014 | |
| KR | 101442565 | B1 | 9/2014 | |
| KR | 20160122289 | A | 10/2016 | |
| KR | 101683109 | B1 | 12/2016 | |
| KR | 101683109 | B1 * | 12/2016 | ......... B01D 46/0005 |
| KR | 20170063361 | A | 6/2017 | |
| KR | 101810149 | B1 | 12/2017 | |
| WO | 2017094829 | A1 | 6/2017 | |

* cited by examiner

*Primary Examiner* — Wojciech Haske
(74) *Attorney, Agent, or Firm* — Dentons US LLP

(57) ABSTRACT

A hydrogen water generator includes a water supply part including a water supply passage including an inlet and an outlet; a water tank coupled to the outlet for receiving and storing water supplied to the inlet; an electrode module coupled to the water tank for generating hydrogen to generate hydrogen water in the water tank; and a water outlet for discharging the hydrogen water stored in the water tank. The water supply passage includes a delayed discharge outlet which is a portion of the water supply passage having a smallest cross-sectional area of a flow path in the water supply passage.

17 Claims, 16 Drawing Sheets

HYDROGEN WATER GENERATOR

CROSS-REFERENCE TO RELATED APPLICATIONS

This application claims the benefit of priority to Korean Patent Application Nos. 10-2019-0056360 filed on May 14, 2019 and 10-2019-0083299 filed on Jul. 10, 2019 with the Korean Intellectual Property Office, the entire contents of which are incorporated herein by reference.

FIELD OF THE DISCLOSURE

The present disclosure relates to a hydrogen water generator, and to a hydrogen water generator that generates and discharges hydrogen water.

BACKGROUND

An example of a hydrogen water generator may be found in Korean Patent No. 10-1320463. The hydrogen water generator produces hydrogen water by electrolyzing water to generate hydrogen and the generated hydrogen dissolves in water to produce hydrogen water.

The hydrogen water generator has a structure in which a discharger is located above a water container and the space between the discharger and the water container is opened. This structure makes it possible to fill the water container with hydrogen water immediately and the water container may be easily removed from the hydrogen water generator. However, when the water container filled with hydrogen water sits in the hydrogen water generator, hydrogen readily escapes from the hydrogen water and maintaining a high level of concentration of hydrogen in the hydrogen water may be reduced.

In addition, hydrogen water is supplied to the water container by discharging hydrogen water from the discharger, which is located at the top of the hydrogen water generator, towards the bottom of the hydrogen water generator where the water container is located. The discharged hydrogen water falls directly into the hydrogen water accumulating in the water container causing an impact. The impact causes shock to the hydrogen water already in the water container which accelerates the escape of hydrogen contained in the hydrogen water. Accordingly, the hydrogen concentration in the hydrogen water may be reduced.

Another example of an hydrogen water generator may be found in Korean Patent No. 10-1427989. The hydrogen water generator includes a water tank provided inside the body. The water stored in the water tank is electrolyzed to generate hydrogen, and the generated hydrogen dissolves into the water of the water tank. Water containing hydrogen is discharged through a discharger protruding from one side of the body.

Since the water tank is provided inside the body, it was difficult to visually see whether the water level has reached close to a full level when water is being replenished. In addition, there is a problem in that water could overflow if care is not taken while pouring water into the water tank.

Another example of an hydrogen water generator may be found in Korean Patent No. 10-1810149. The hydrogen water generator includes a water tank. The water tank includes a container and a lid. The lid closes the container to maintain airtightness, and when the water is supplied to the container, the lid is opened.

The supplementing water falls directly into the hydrogen water stored in the water tank, which causes impact with the hydrogen water causing the hydrogen contained in the hydrogen water to escape. Therefore, the hydrogen water of the water tank needs to be electrolyzed again so that an acceptable level of hydrogen concentration is dissolved in the water, and there is a problem in that time is consumed while the water is electrolyzed.

SUMMARY

One aspect is to minimize the loss of hydrogen in the hydrogen water during supplementing of water in the water tank.

Another aspect is to solve a problem where water could easily overflow when the user is inattentive or the user is not able to react fast.

The disclosure describes a hydrogen water generator including a water supply part including a water supply passage including an inlet and an outlet; a water tank coupled to the outlet for receiving and storing water supplied to the inlet; an electrode module coupled to the water tank for generating hydrogen to generate hydrogen water in the water tank; and a water outlet for discharging the hydrogen water stored in the water tank, where the water supply passage includes a delayed discharge outlet which is a portion of the water supply passage having a smallest cross-sectional area of a flow path in the water supply passage.

The disclosure describes a hydrogen water generator including a water supply part including a water supply passage including an inlet and an outlet; a water tank coupled to the outlet for receiving and storing water supplied to the inlet; an electrode module coupled to the water tank for generating hydrogen to generate hydrogen water in the water tank; and a water outlet for discharging the hydrogen water stored in the water tank, where a portion of the water supply passage is bent such that the water from the inlet changes in direction to flow to the outlet.

DETAILED DESCRIPTION OF THE PREFERRED EMBODIMENTS

Figure 1:
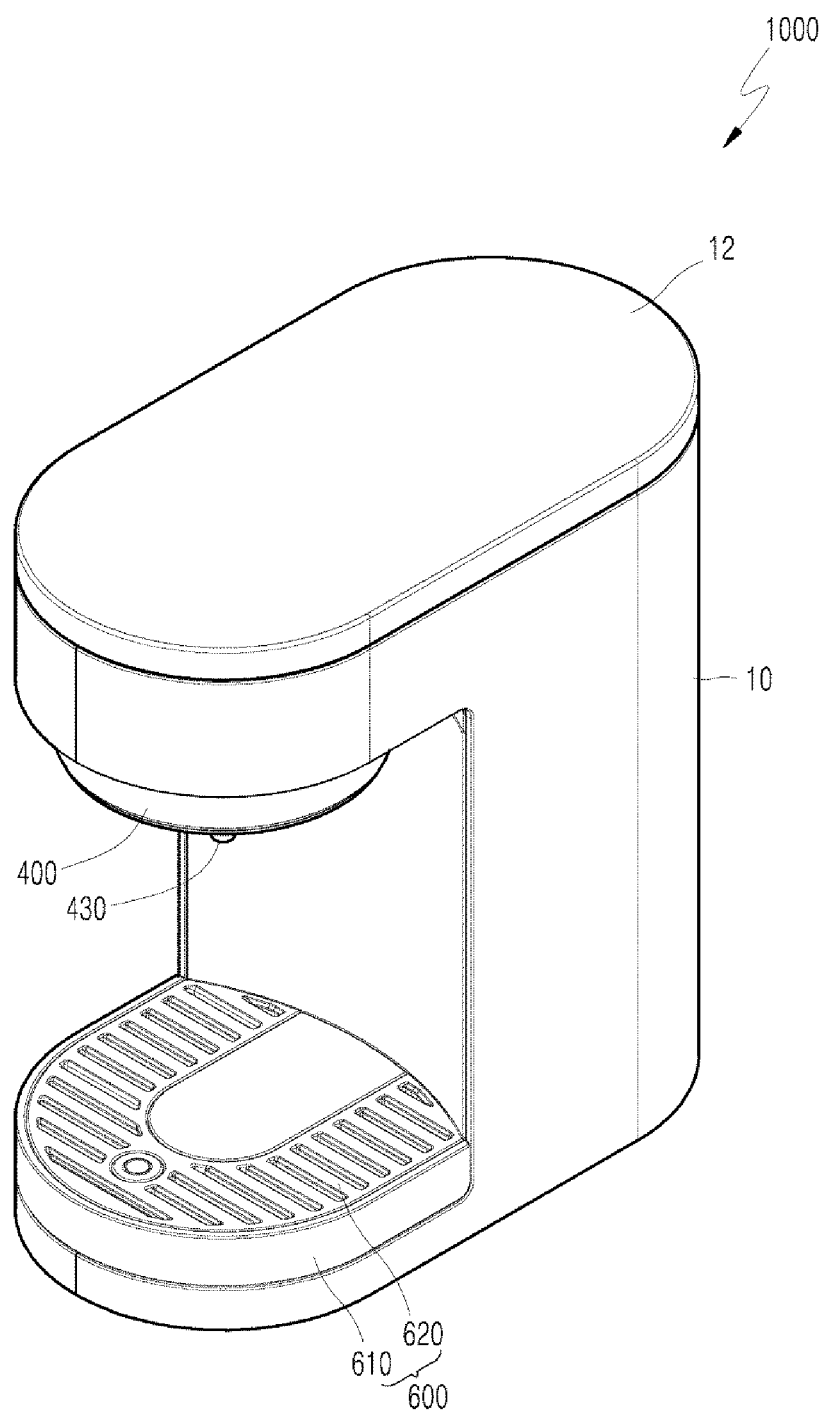
FIG. 1 is a perspective view of a hydrogen water generator according to an embodiment of the present invention.

Hereinafter, preferred embodiments of the present invention will be described in detail with reference to the accompanying drawings. In the drawings. like numbers may refer to like elements.

FIG. 1 is a perspective view of a hydrogen water generator 1000 according to an embodiment of the present invention.

As shown in FIG. 1, the hydrogen water generator 1000 according to the embodiment of the present invention has a body 10 forming an outer appearance and a top plate 12. The top plate 12 covers a top surface of the body 10.

The hydrogen water generator 1000 includes a water discharge part 400 and a seating part 600 provided on one side of the body 10. The water discharge part 400 and the seating part 600 are disposed up and down with respect to the body 10 and are apart from each other by a predetermined distance therebetween.

Figure 2:
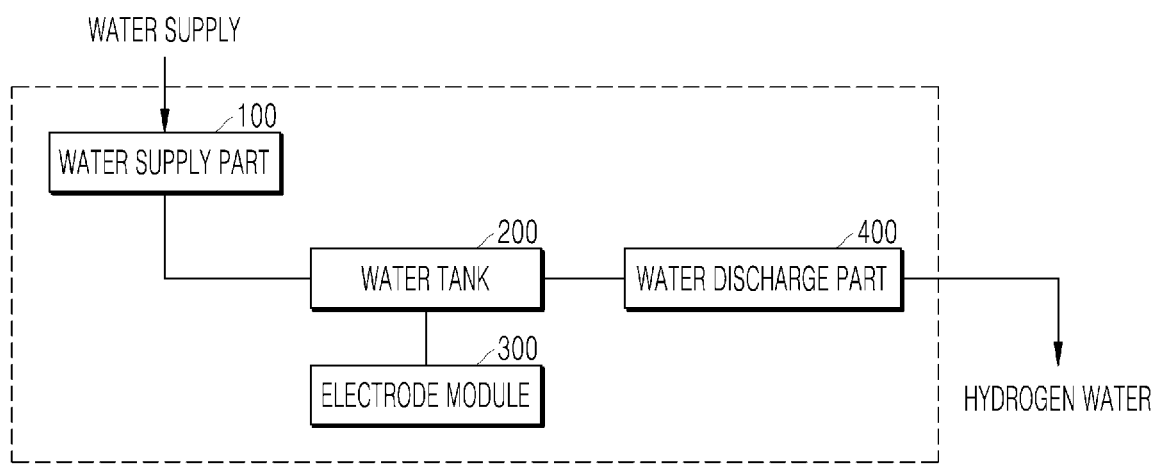
FIG. 2 is a block diagram showing a path of water flow in the hydrogen water generator according to the embodiment of the present invention.
Figure 3:
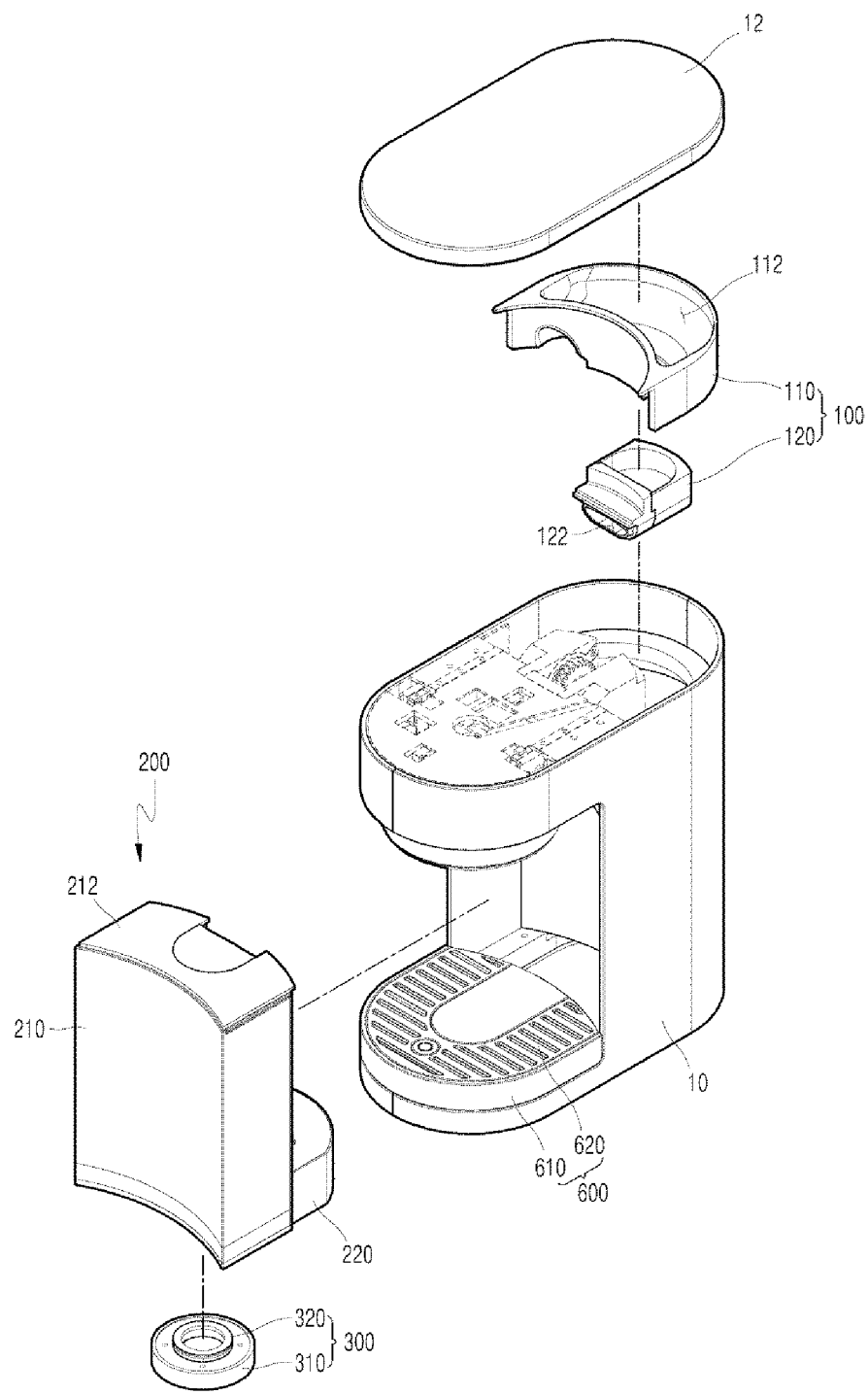
FIG. 3 is an exploded perspective view of the hydrogen water generator according to the embodiment of the present invention.

FIG. 2 is a block diagram showing a path of water flow in a hydrogen water generator according to an embodiment of the present invention, and FIG. 3 is an exploded perspective view of a hydrogen water generator according to an embodiment of the present invention.

As shown in FIG. 2 and FIG. 3, the body 10 of the hydrogen water generator 1000 according to the embodiment of the present invention includes a water supply part 100, a water tank 200, an electrode module 300, and a water discharge part 400 at the inside thereof. However, the water discharge part 400 may be partially exposed to the outside of the body 10 as shown in FIG. 1.

Water is supplied to the water supply part 100. The water passes through the water supply part 100, enters and is stored in the water tank 200. The water stored in the water tank 200 is electrolyzed by the electrode module 300, and hydrogen is generated through electrolysis. The generated hydrogen dissolves into the water to form hydrogen water in the water tank 200.

The water stored in the water tank 200 is drawn out of the body 10 through the water discharge part 400. The hydrogen water generator 1000 according to the embodiment of the present invention supplies the hydrogen water to the user through the above process. A more detailed description of each of the components will be described below.

Figure 4:
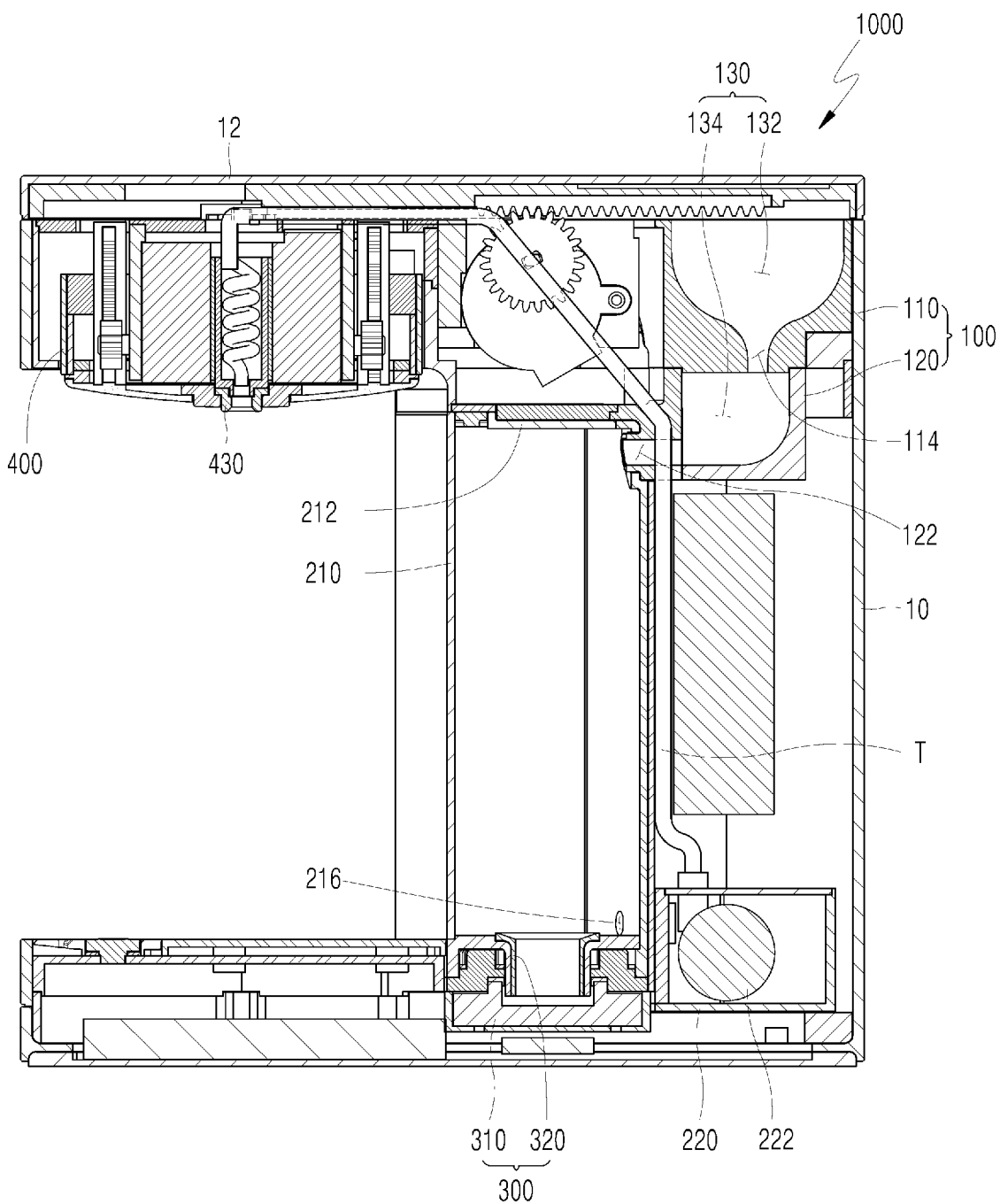
FIG. 4 is a cross-sectional view showing an inside of a body of the hydrogen water generator according to the embodiment of the present invention.
Figure 5:
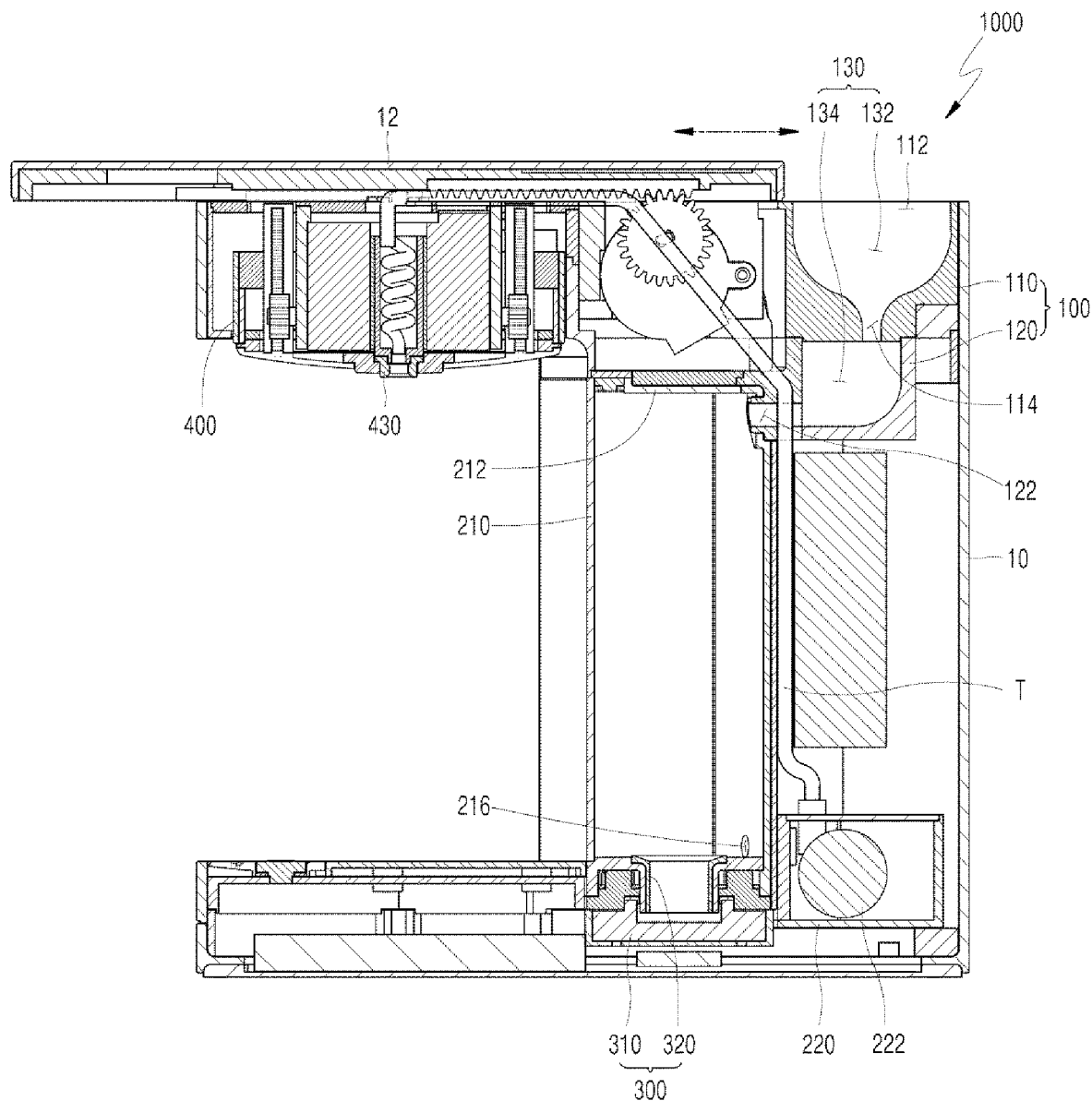
FIG. 5 is a cross-sectional view showing an open state of a top plate of the hydrogen water generator according to the embodiment of the present invention.

FIG. 4 is a cross-sectional view showing an inside of the body of the hydrogen water generator according to the embodiment of the present invention, and FIG. 5 is a cross-sectional view showing an open state of a top plate of the hydrogen water generator according to the embodiment of the present invention.

As shown in FIGS. 4 and 5, in the hydrogen water generator 1000 according to the embodiment of the present invention, a water supply passage 130 is formed in the water supply part 100 through which water may flow.

The water supply part 100 includes an inlet 112, an outlet 122, and a water supply passage 130. The inlet 112 is an opening that opens upward as an inlet of the water supply part 100. The outlet 122 is an outlet of the water supply part 100 and is provided at a position lower than the inlet 112. The water supply passage 130 is a passage that couples the inlet 112 and the outlet 122 and has at least a portion which is bent.

Water is accommodated in the water tank 200. The water accommodated in the water tank 200 is introduced from the inlet 112 and is supplied to the water tank 200 through the water supply passage 130 and the outlet 122.

The water tank 200 is disposed at a lower position than the water supply part 100. As a result, water flows downward from the water supply part 100 into the water tank 200 by gravity. According to one embodiment, a part of the water tank 200 may be disposed to be at the same level as or higher than the water supply part 100, however, most or all of the water accommodation space of the water tank 200 may be located at a lower position than the water supply part 100.

The electrode module 300 may be provided in the water tank 200. The electrode module 300 generates hydrogen by electrolysis of some of the water stored in the water tank 200, and the hydrogen dissolves into the remaining water to form hydrogen water in the water tank 200.

The water discharge part 400 discharges the hydrogen water stored in the water tank 200 to the outside.

Further details of each configuration described above will now be described.

In the hydrogen water generator 1000 according to the embodiment of the present invention, the body 10 includes an inner space. The water supply part 100, the water tank 200, the electrode module 300, and the water discharge part 400 are accommodated in the inner space of the body 10. Part of the water discharge part 400 may protrude or be exposed to the outside of the body 10.

The body 10 supports the load of the water supply part 100, the water tank 200, the electrode module 300, and the water discharge part 400. The body 10 may be formed of a material which may make an interior of the body 10 airtight with respect to the outside environment.

The water discharge part 400 and the seating part 600 may be disposed on one side of the body 10 to protrude from the side of the body 10, respectively. The seating part 600 may extend horizontally from a lower portion of the body 10. The water discharge part 400 may be installed at an upper portion of the body 10. The body 10 may have a form in which at least a portion of the body 10 extends horizontally from an upper portion and a lower portion of the body 10, and the water discharge part 400 and the seating part 600 may be installed therein, respectively.

The seating part 600 and the water discharge part 400 are respectively disposed on one side of the body 10, and the seating part 600 may be disposed below the water discharge part 400 vertically to face the water discharge part 400.

A portion of the upper surface of the body 10 may be opened. The top plate 12 is movably coupled to the open upper surface of the body 10. That is, the top plate 12 is movably coupled to the upper surface of the body 10, and opens or closes the opening of the upper surface of the body 10.

In the present embodiment, the top plate 12 slidingly moves against the body 10 to open or close the opening of the upper surface of the body 10.

The top plate 12 may slide in one direction with respect to the body 10 to open the opening of the upper surface of the body 10. The top plate 12 may also close the opening of upper surface of the body 10 which has been opened by sliding in the opposite direction with respect to the body 10. The top plate 12 may slide by a distance that opens the upper surface so that the inlet 112 disposed in the inner space of the body 10 may be exposed.

The top plate 12 may include a sealing member. The sealing member may allow the top plate 12 to make an airtight seal with the body 10 when the top plate 12 closes the opening of the upper surface of the body 10. The top plate 12 may slide in a direction parallel to an imaginary plane passing through the edge of the inlet 112. For example, when the imaginary plane passing through the edge of the injection hole 112 is horizontal with respect to the ground, the top plate 12 slides in a direction horizontal with respect to the ground to open or close the inlet 112.

The top plate 12 and the body 10 may be movably coupled through a pair of rails running in parallel and may be formed at the top plate 12 or at the upper surface of the body 10. The top plate 12 may be slidingly moved with a power source such as a motor. This is exemplary and according to various embodiments, the top plate 12 may be combined with the body 10 in various forms to open and close the inlet 112.

Figure 6:
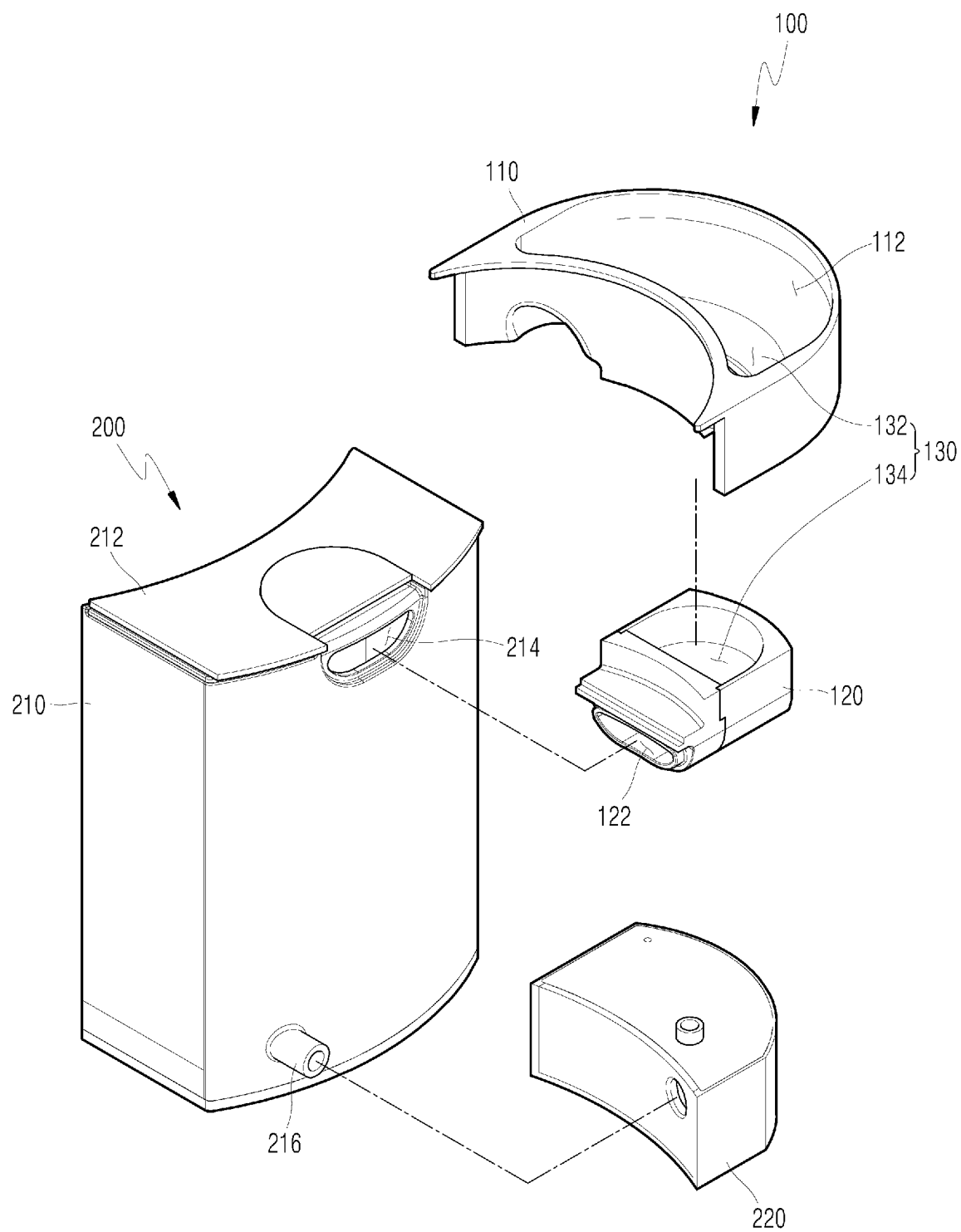
FIG. 6 is an exploded perspective view of a water supply part and a water tank included in the hydrogen water generator according to the embodiment of the present invention.
Figure 7:
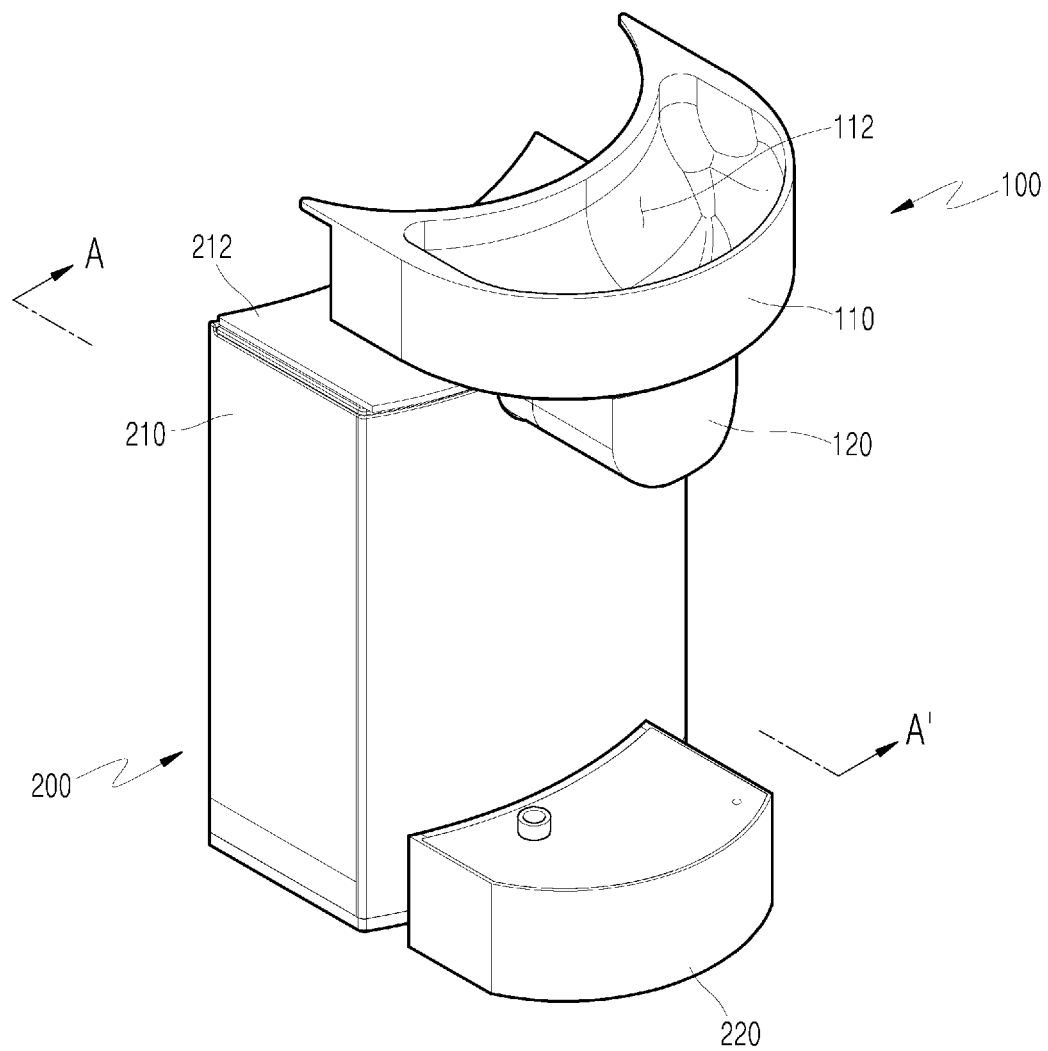
FIG. 7 is a perspective view showing a state in which the water supply part and the water tank included in the hydrogen water generator in FIG. 6 is coupled.
Figure 8:
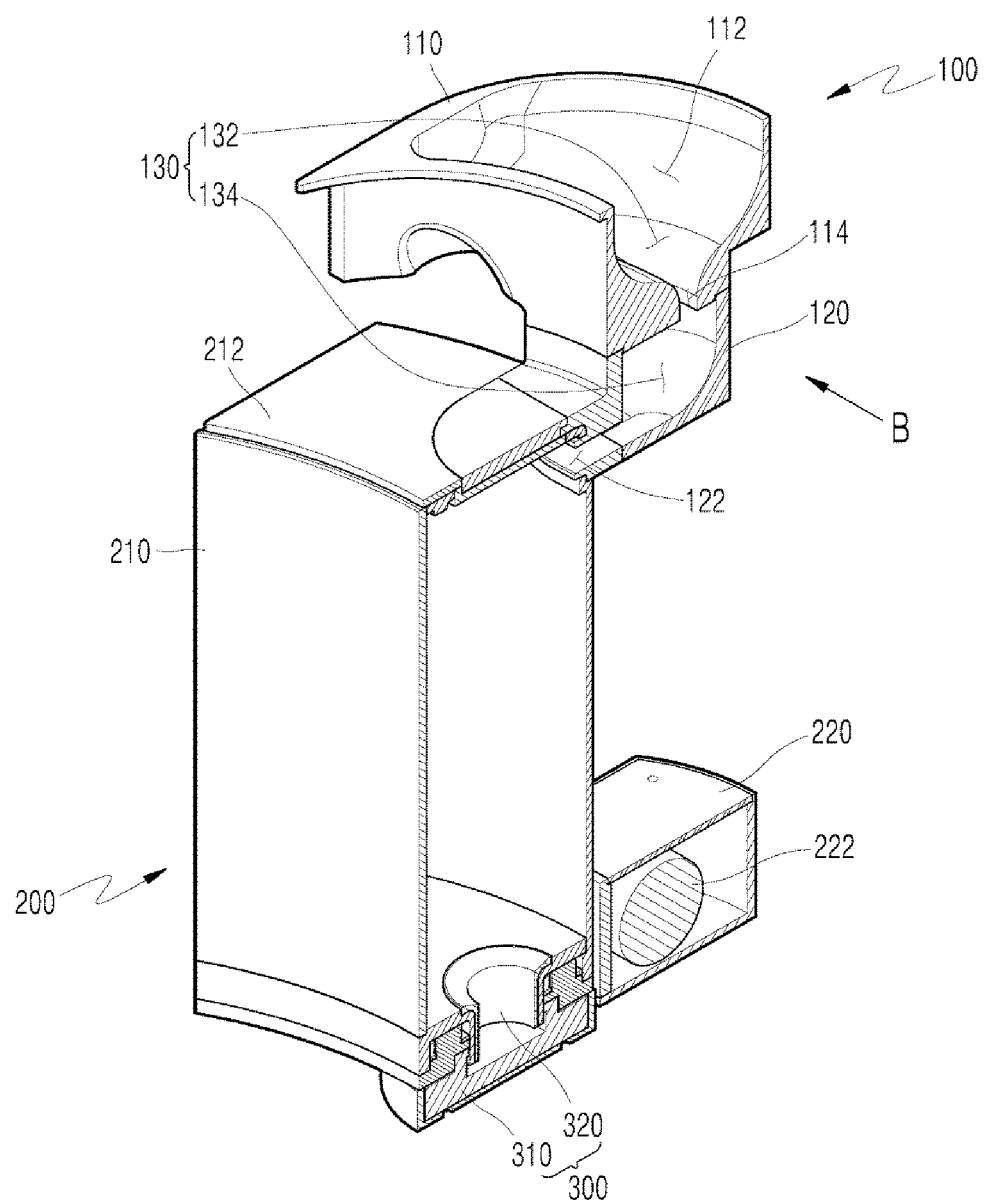
FIG. 8 is a cross-sectional view taken along line AA' of FIG. 7.

FIG. 6 is an exploded perspective view of the water supply part 100 and the water tank 200 included in the hydrogen water generator 1000 according to the embodiment of the present invention, FIG. 7 is a perspective view showing a state in which the water supply part 100 and the water tank 200 included in the hydrogen water generator in FIG. 6 is coupled, and FIG. 8 is a cross-sectional view taken along line AA' of FIG. 7.

The water supply part 100, the water tank 200, the electrode module 300, and the water discharge part 400 shown in FIGS. 6 to 8, are disposed in the inner space of the hydrogen water generator 1000 according to the embodiment of the present invention.

The water supply part 100 includes the inlet 112 through which water is supplied to the hydrogen water generator 1000. The water supply part 100 guides the water supplied from the outside to the water tank 200.

The water supply part 100 is disposed at a position higher than the water tank 200. Since water flows from the top to the bottom by gravity, the water supplied to the water supply part 100 flows down to the water tank 200.

The water passing through the water supply part 100 is introduced into the water tank 200. The water tank 200 is provided with a space therein to accommodate the introduced water. The water tank 200 includes an inlet passage 214 formed at an upper portion of one side thereof, and the inlet passage 214 is coupled to the water supply part 100. In addition, the water tank 200 includes an outlet passage 216. The outlet passage 216 is provided at a lower side of one side of the water tank 200 and is coupled to the water discharge part 400.

The inlet passage 214 is a passage through which water flows from the outlet 122 into the the water tank 200. The outlet 122 is coupled to the inlet passage 214, for example, by inserting a protruding portion of the outlet 122 into a hole of the inlet passage 214. The inlet passage 214 and the outlet 122 may be sealingly coupled to each other to prevent any water leaks.

The outlet passage 216 is a passage through which water received in the water tank 200 is discharged, and the outlet passage 216 may be coupled to a pump 222. The pump 222 allows the water stored in the water tank 200 to be pumped to a water outlet 430 of the water discharge part 400 through a transfer pipe T. Water discharged through the outlet passage 216 flows along the transfer pipe T, and is discharged to the outside of the body 10 through the water outlet 430 of the water discharge part 400.

The water tank 200 may include a first tank 210 and a second tank 220.

The first tank 210 may include a cover 212 covering an open upper surface of a first tank 210. The first tank 210 may include a bottom surface and side walls. The first tank 210 and the cover 212 form a space in which the water introduced through the outlet 122 is stored. The outlet passage 216 may be provided at a lower portion of a side wall of the first tank 210, and the outlet passage 216 may be coupled to the second tank 220.

The second tank 220 may include a pump 222 disposed in an inner space of the second tank 220. The pump 222 disposed inside the second tank 220 is coupled to the outlet passage 216 to pump the water stored in the first tank 210 into the second tank 220. The transfer pipe T may be coupled to a portion where water is discharged from the pump 222 or may be coupled to the second tank 220.

This is exemplary and according to various embodiments, the water tank 200 may be formed with one or more tanks, and various types of components may be combined for moving the water stored in the water tank 200 to the water outlet 430 of the water discharge part.

The electrode module 300 may be coupled to a bottom surface of the first tank 210 of the water tank 200. Water received in the first tank 210 accumulates at the bottom surface of the first tank 210 to flow into the electrode module 300. The electrode module 300 may include an electrolyzer 310 including a case having a plurality of holes and a positive electrode and a negative electrode therein. An electrolyte is filled between the positive electrode and the negative electrode of the electrolyzer 310, and the electrolyte allows electrons to move between the positive electrode and the negative electrode. The electrolyte may be in the form of an ionic membrane.

This is exemplary, and the electrolyzer 310 for electrolysis of water may be implemented in various forms according to the embodiment of the present invention.

When current is supplied to the positive electrode and the negative electrode, water is electrolyzed and the water at the negative electrode combines with electrons supplied from the current to form hydrogen and negatively charged oxygen. Oxygen ions pass through the ionic membrane and react at the positive electrode to form oxygen and generate electrons for the electrical circuit.

Since hydrogen is generated at the negative electrode, the negative electrode of the electrolyzer 310 is disposed adjacent to the first tank 210. The electrode module 300 further includes a hydrogen generating port 320 forming a passage having a predetermined width in the direction of the first tank 210.

The hydrogen generating port 320 is disposed adjacent to the negative electrode. The hydrogen generating port 320 may be cylindrical in which a passage of a predetermined size is formed, and the passage formed in the hydrogen generating port 320 couples the negative electrode and the water accommodation space of the first tank 210. The hydrogen generating port 320 provides a path through which hydrogen generated at the negative electrode flows into the first tank 210.

Since the electrode module 300 is coupled to the bottom surface of the first tank 210, the hydrogen generated at the negative electrode of the electrolyzer 310 moves upward through the hydrogen generating port 320, and the hydrogen introduced into first tank 210 dissolves into the water contained in first tank 210.

As shown in FIG. 5, the water discharge part 400 is disposed at a position extending from one side at the upper portion of the body 10. The water outlet 430 of the water discharge part 400 faces downward. The seating part 600 is disposed below the water outlet 430.

The water outlet 430 may be coupled to the transfer pipe T. That is, the hydrogen water stored in the water tank 200 flows into the water outlet 430 via the transfer pipe T. When the pump 222 operates to move the hydrogen water stored in the first tank 210, the hydrogen water stored in the first tank 210 flows into the transfer pipe T, and the hydrogen water flowing through the transfer pipe T is discharged at the water outlet 430.

A water container may be seated in the seating part 600 to receive the hydrogen water. The water container accumulates the hydrogen water discharged downward from the water outlet 430. The seating part 600 may include a drip tray 610 having a predetermined capacity and a support plate 620 on which the water container may be placed.

Hereinafter, above described the water supply part will be described in more detail.

Figure 9:
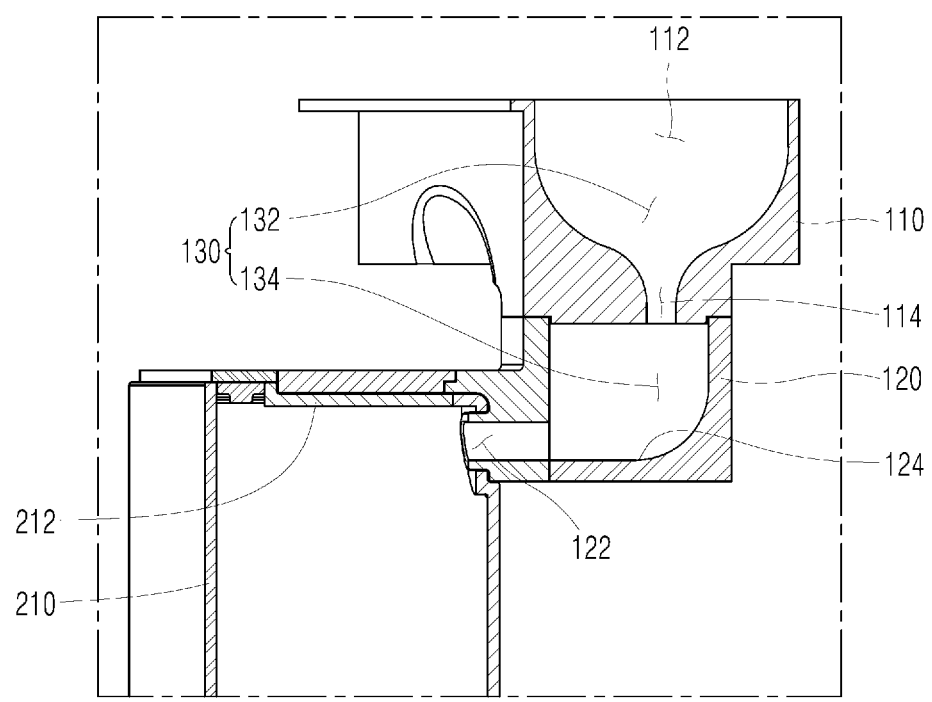
FIG. 9 is an enlarged partial cross-sectional view of B of FIG. 8.
Figure 10:
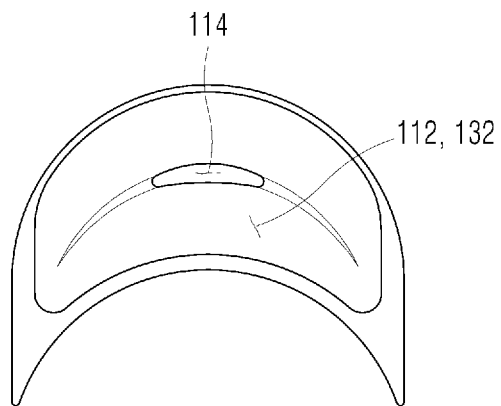
FIG. 10 is a plan view showing a first passage body in the water supply part according to the embodiment of the present invention.
Figure 11:
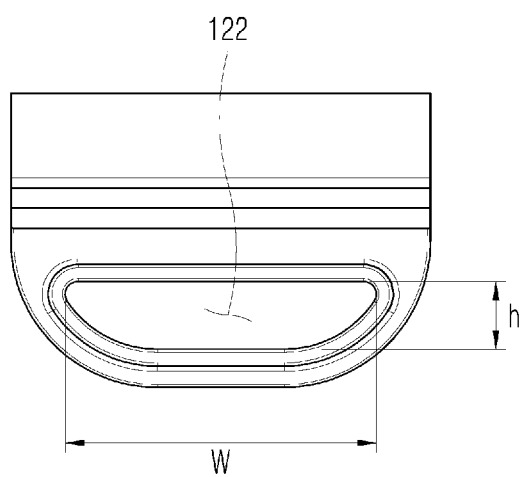
FIG. 11 is a side view showing a second passage body in the water supply part according to the embodiment of the present invention.

FIG. 9 is an enlarged partial cross-sectional view of B of FIG. 8, FIG. 10 is a plan view showing a first passage body in the water supply part according to the embodiment of the present invention, and FIG. 11 is a side view showing a second passage body in water supply part according to the embodiment of the present invention.

Referring to FIGS. 9 to 11, the water supply part 100 includes the inlet 112, the outlet 122, and the water supply passage 130.

The inlet 112 is at one end of the water supply passage 130 and is formed as an opening that is open towards the top. The inlet 112 is opened or closed as the top plate 12 slides with respect to the body 10.

The outlet 122 is disposed below the inlet 112 at the other end of the water supply passage 130. In addition, the outlet 122 is formed as an opening that opens toward one side of the water supply part 100. The outlet 122 may protrude at an end thereof at one side of the water supply part 100. The protruding end of the outlet 122 may at least partially be inserted into the inlet passage 214 of the water tank 200. As described above, the outlet 122 and the inlet passage 214 may be sealingly coupled.

The inlet 112 and the outlet 122 are coupled through the water supply passage 130. The water supply passage 130 provides a path through which water supplied from the outside flows into the water tank 200. Water supplied to the inlet 112 flows along the water supply passage 130 and is discharged to the outlet 122. That is, when water is poured into the inlet 112 in the open state of the top plate 12, the water flows through the water supply passage 130 and the outlet 122 to flow into the first tank 210 of the water tank 200.

The water supply passage 130 may be bent at a portion thereof at least along the flow path through which water flows.

According to the embodiment, the water falling due to gravity enters the inlet 112, and the flow rate of the falling water is reduced when making contact with a curved section of the water supply passage 130. In addition, the section in which the flow path of the water supply passage 130 is bent gently declines toward the outlet 122. Hence, the water having the reduced flow rate passes through the outlet 122 and into the first tank 210 of the water tank 200.

The water supply part 100 may include a first passage body 110 and a second passage body 120.

The first passage body 110 has an inlet 112 formed on the upper surface thereof. In addition, a first flow path 132 coupled to the inlet 112 is formed in the first passage body 110.

A part of the upper surface of the second passage body 120 is opened upward. The upper surface of which a part of the second passage body 120 is opened is coupled to the first flow path 132. One side surface of the second passage body 120 is provided with the outlet 122 that may protrude laterally. A second flow path 134 is formed inside the second passage body 120 to be coupled to the first flow path 132 and to the outlet 122. That is, the first flow path 132 and the second flow path 134 are provided in the first passage body 110 and the second passage body 120, respectively. The first passage body 110 and the second passage body 120 are coupled with the first passage body 110 being on top of the second passage body 120, and they are coupled to each other to form the water supply passage 130.

As the first flow path 132 of the first passage body 110 approaches adjacent to the inlet 112, the cross-sectional area of the flow path increases, and as the first flow path 132 approaches the bottom of the first passage body 110 towards the second passage body 120, the cross-sectional area of the flow path decreases. At this time, a change in the cross-sectional area of the first flow path 132 is relatively small as the first flow path 132 approaches adjacent to the inlet 112, and the change in the cross-sectional area of the first flow path 132 becomes relatively larger as the first flow path 132 approaches the bottom of the first passage body 110. That is, the first flow path 132 has a relatively slow change rate towards the upper portion adjacent to the inlet 112 and the cross-sectional area of the flow path 132 is reduced slowly. However, as the first flow path 132 approaches adjacent to the second flow path 134 of the second passage body 120, the cross-sectional area of the flow path reduces rapidly.

The lowest point of the first flow path 132 has the smallest cross-sectional area among the cross-sectional area of flow paths in the water supply passage 130. The point where the cross-sectional area of the flow path is the smallest in the water supply passage 130 may be known as a delayed discharge outlet 114.

The second passage body 120 is disposed below the first passage body 110. The second flow path 134 is formed in the second passage body 120 and is coupled to the first flow path 132. The outlet 122 is formed at the end of the second flow path 134 along the direction in which water flows out from the water supply passage 130.

The upper surface of the second passage body 120 includes an opening that is wider than the delayed discharge outlet 114, and the opening formed on the upper surface of the second passage body 120 becomes an inlet of the second flow path 134. The water flowing downward from the delayed discharge outlet 114 flows into the second flow path 134. Since the outlet 122 is located below the water supply part 100 and is opened towards one side, the water supply flow passage 130 may be bent on at least a portion of the second flow path 134.

The water flowing into the second passage body 120 through the delayed discharge outlet 114 moves from up to down, that is, from top to bottom. Water that falls on a portion of an inner side surface of the second passage body 120 (an inner side surface of the second flow path 134) changes in flow direction before flowing towards the outlet 122. The water that falls from the delayed discharge outlet 114 and the inner surface of the second passage body 120 in which the water makes contact may be known as a flow guide surface 124. The flow guide surface 124 may be formed as a curved surface that is gently declined toward the outlet 122. The flow guide surface 124 is formed as a curved surface that declines in one direction and is formed vertically below the delayed discharge outlet 114. That is, the flow guide surface 124 has a curved surface where the height becomes gradually smaller towards the water tank 200.

The flow guide surface 124 having the curved surface gradually declining in one direction may not only cancel the shock caused by impact of falling water, but may also induce the water passing through the second flow path 134 after passing through the flow path 132 to flow smoothly to the outlet 122.

This is exemplary and according to various embodiments, the delayed discharge outlet 114 may be located on the water supply passage 130, and the position of the first passage body 110 or the second passage body 120 is not limited. Some modified embodiments are described below.

Referring to FIGS. 10 and 11, according to one embodiment of the present invention, the delayed discharge outlet 114 is formed in the first passage body 110 and the outlet 122 is formed in the second passage body 120 to have different cross-sectional areas. The cross-sectional area of the delayed discharge outlet 114 is formed smaller than the cross-sectional area of the outlet 122. The delayed discharge outlet 114 and the outlet 122 are disposed on the water supply passage 130. When the water passing through the delayed discharge outlet 114 passes through the outlet 122 formed wider than the delayed discharge outlet 114, the water flow rate out of the outlet 122 is slowed.

Furthermore, as illustrated in FIG. 11, the outlet 122 of the second passage body 120 may have a width w in the horizontal direction that is different than a height h in the vertical direction. The flow passage cross-sectional area of the outlet 122 may be wider than the flow passage cross-sectional area of the delayed discharge outlet 114, and the outlet 122 has a width w in the horizontal direction longer than the height h in the vertical direction. The height h in the longitudinal direction may be formed longer than the maximum inner diameter of the delayed discharge outlet 114.

This may allow the outlet 122 to have a wide opening in the lateral direction so that water discharged through the outlet 122 flows slowly into the water tank 200. Water passing through the delayed discharge port 114 flows into the outlet 122. Since the delayed discharge port 114 has a narrower flow path than the outlet 122, the water passing through the delayed discharge port 114 may be relatively slow in the discharge port 122. In addition, since the outlet 122 has a wide opening from left to right, the water flowing by gravity is widely distributed from left to right in the outlet 122 to flow more slowly.

The shape of the outlet 122 and the delayed discharge port 114 as described above allows the water flowing into the water tank 200 to flow along the wall surface of the water tank 200 at a relatively slow rate. This may have the effect of preventing the escape of hydrogen from the hydrogen water contained in the water tank 200 due to impact of the falling supplementing water.

Figure 12:
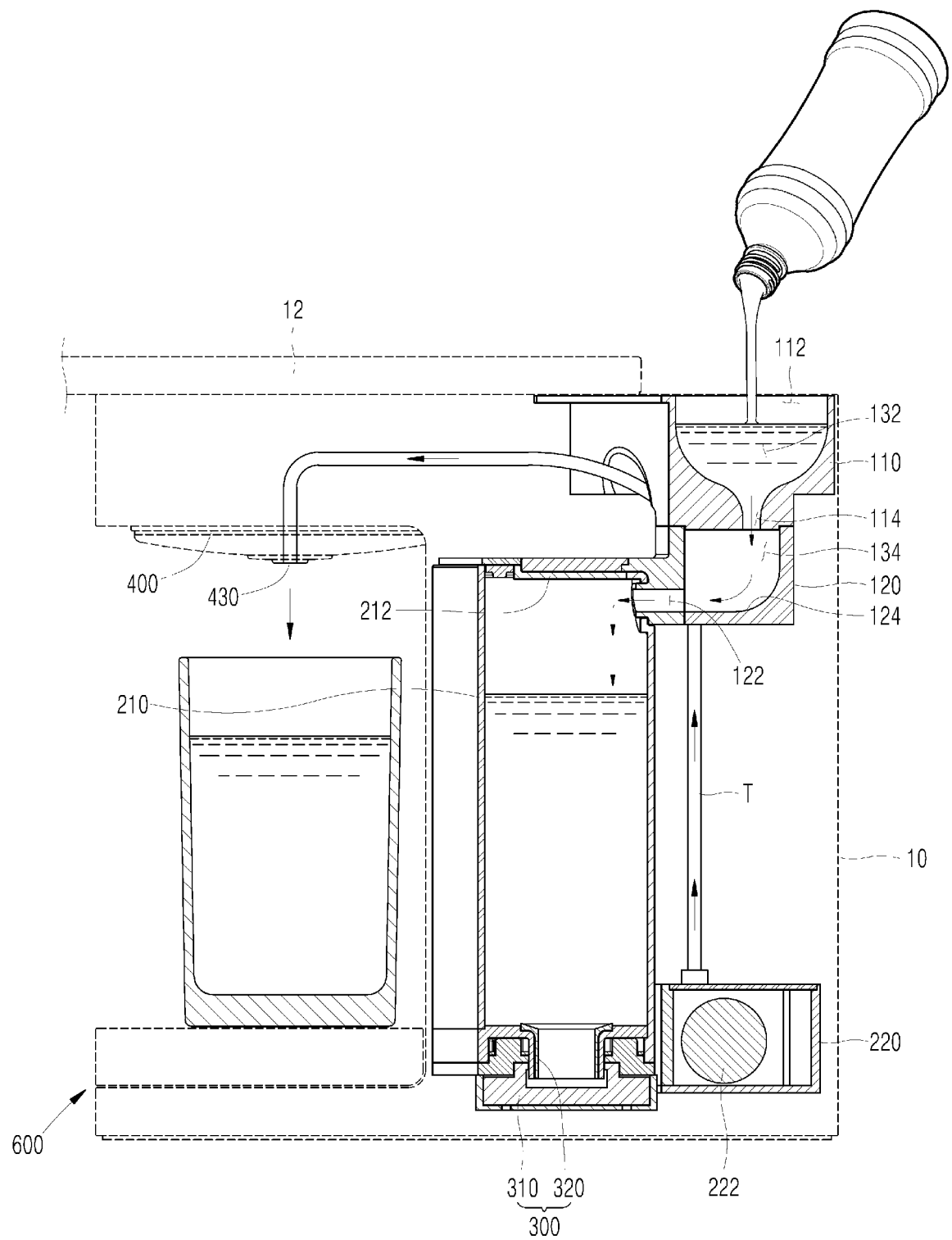
FIG. 12 is a cross-sectional view showing a state in which water moves in the hydrogen water generator according to an embodiment of the present invention.
Figure 13:
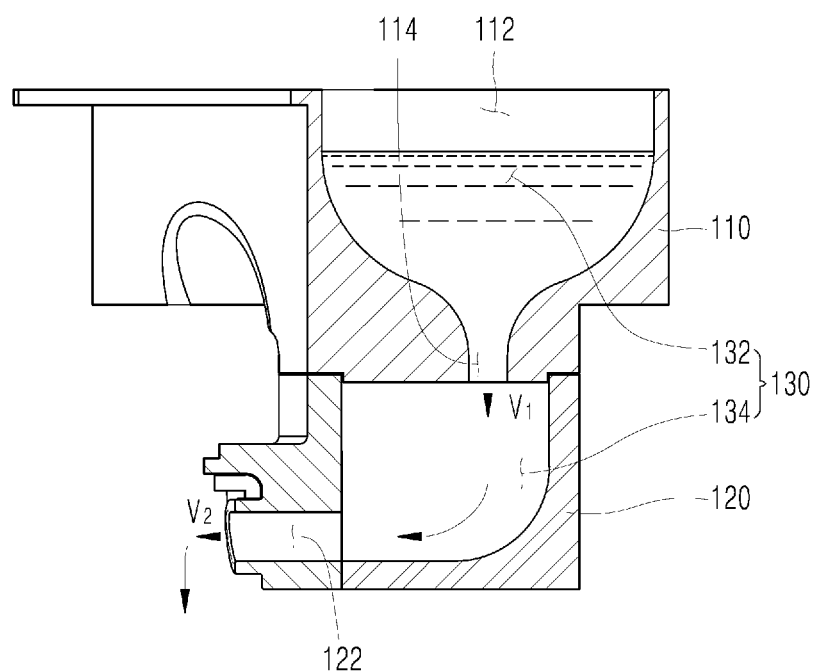
FIG. 13 is a view showing a flow of water passing through the water supply part when water is supplied to the water tank including hydrogen water according to the embodiment of the present invention.

FIG. 12 is a cross-sectional view showing a state in which water is moved in the hydrogen water generator according to the embodiment of the present invention, and FIG. 13 is a view showing a flow of water passing through the water supply part when water is supplied to the hydrogen water generator according to the embodiment of the present invention.

Referring to FIGS. 12 and 13, the hydrogen water generator 1000 according to the embodiment of the present invention is supplemented with water by pouring water into the inlet 112. The inlet 112 is opened as the top plate 12 slides in one direction. Water poured into the inlet 112 is partially held by the first flow path 132 in the course of passing through the delayed discharge outlet 114. Water passing through the delayed discharge outlet 114 falls in the vertical direction and is discharged vertically downward from the delayed discharge outlet 114. After passing through the delayed discharge outlet 114, the water makes contact with the flow guide surface 124, which changes the flow path of the water, and is directed to the outlet 122.

When the flow rate of the water passing through the delayed discharge outlet 114 is V1 and the flow rate of the water passing through the outlet 122 is V2, the flow path area of the delayed discharge outlet 114 is smaller than the flow path area of the outlet 122, so V2 is slower than V1. In addition, the outlet 122 is formed with a wide shape in the horizontal direction so that the water passing through the outlet 122 may flow along the adjacent inner surface (side surface wall) of the water tank 200.

Figure 14:
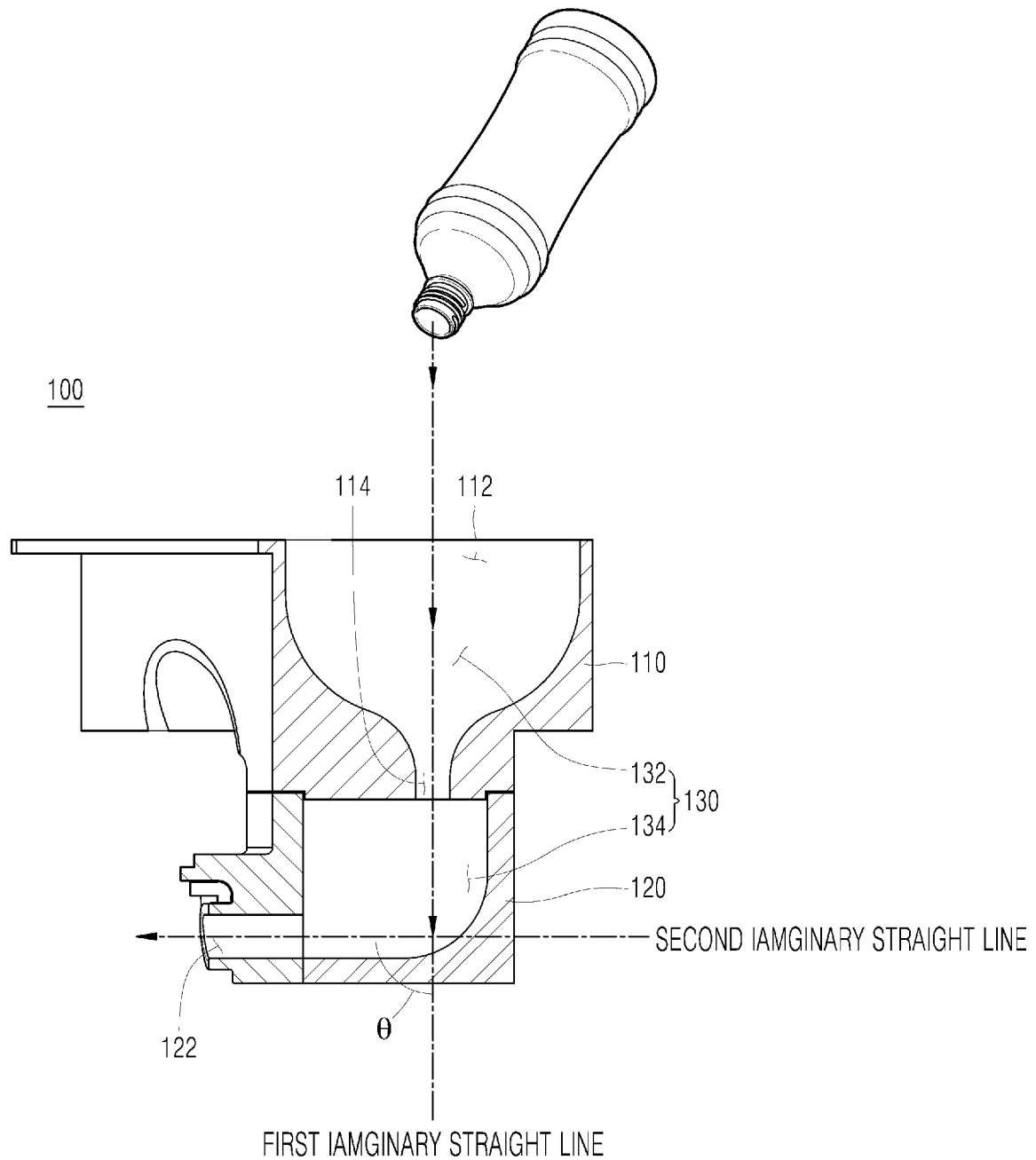
FIG. 14 is a view showing a direction of water passing through a first flow path and a second flow path in the water supply part according to the embodiment of the present invention.
Figure 15:
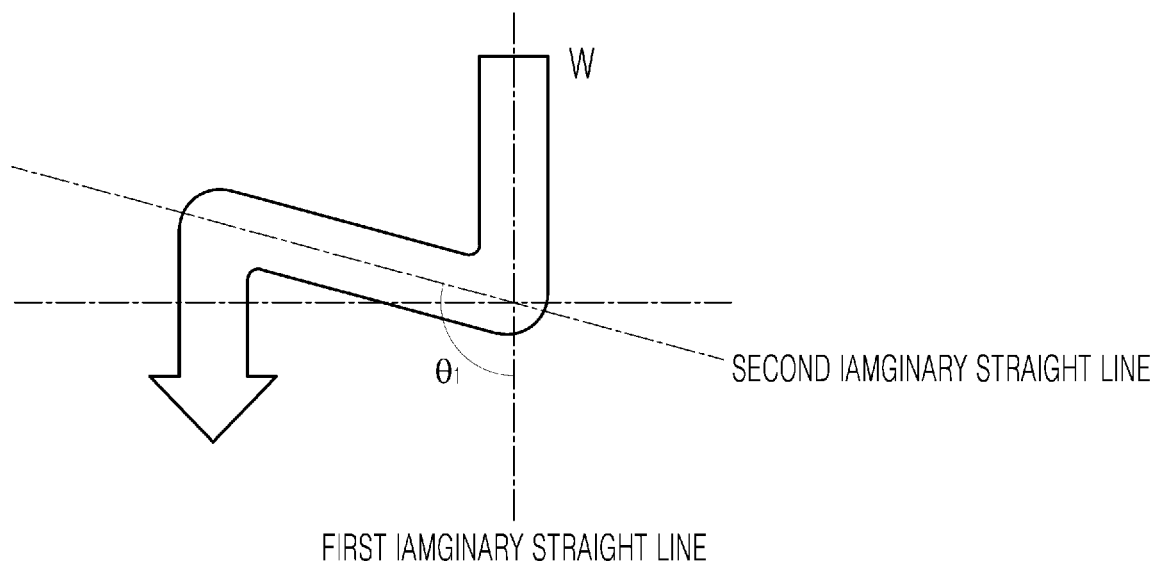
FIG. 15 is a view showing a path of water passing through the water supply part in the hydrogen water generator according to the embodiment of the present invention.

FIG. 14 is a view showing a direction of water passing through the first flow path and the second flow path in the hydrogen water generator according to the embodiment of the present invention, and FIG. 15 is a view showing a path of water passing through the water supply part in the hydrogen water generator according to the embodiment of the present invention.

Referring to FIGS. 14 and 15, the water supplied to the inlet 112 in the hydrogen water generator 1000 according to the embodiment of the present invention may fall in the vertical direction. That is, the water in the first flow path 132 may fall by gravity. Water passing through the first flow path 132 and passing through the delayed discharge outlet 114 enters the second flow path 134 formed in the second passage body 120. Water passing through the delayed discharge outlet 114 makes contact with the flow guide surface 124 disposed vertically below the delayed discharge port 114, which changes the flow direction of the water. Since the outlet 122 opens toward the side of the second passage body 120, the water passing through the second flow path 134 flows in the horizontal direction and flows into the water tank 200.

When a first imaginary straight line is drawn corresponding to the flow path of the water passing through the first flow path 132 and a second imaginary line is drawn corresponding to the flow path of the water passing through the outlet 122 which is the outlet of the second flow path 134, The first imaginary straight line and the second imaginary straight line intersect at a position corresponding to the flow guide surface 124. In the present embodiment, the angle formed by the intersection of the first imaginary straight line and the second imaginary straight line is formed to be perpendicular as shown in FIG. 14 or greater than 0 (greater than 90 degrees) as shown in FIG. 15. That is, the flow of water W goes from top to bottom along the first imaginary straight line, the direction is changed to go along the second imaginary straight line, and the angle at which the direction of water flow W is switched is 1 which is equal to or greater than a right angle.

Figure 16:
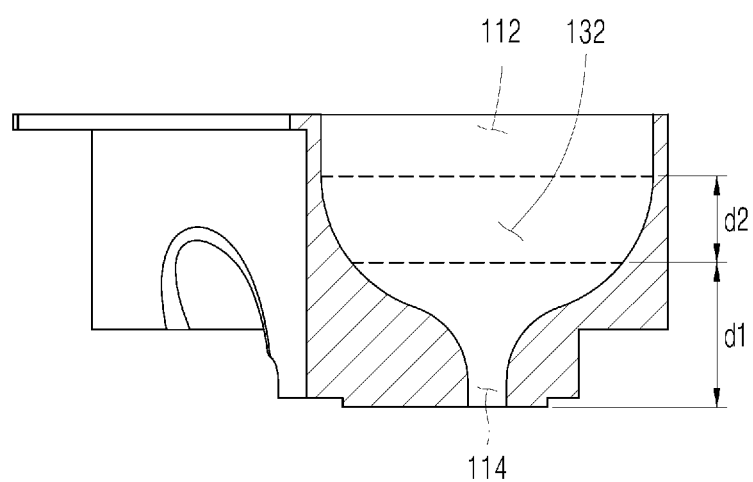
FIG. 16 is a view showing a water level change of a first passage body 110 during supply of water in a water supply unit according to the embodiment of the present invention based on unit time.

FIG. 16 is a view showing a water level change of the first passage body 110 during supply of water in the water supply part 100 according to the embodiment of the present invention based on unit time.

FIG. 16 shows a hypothetical water level d1 at a lower portion and a water level d2 at an upper portion of the first flow path 132 when a same amount of water is being supplied at same unit time to each level. As shown in FIG. 16, a water level d1 changed at the lower portion of the first flow path 132 is different from a water level d2 changed at the upper portion of the first flow body 132, that is if the same amount of water is supplied at the same time, the water level gradually increases toward the upper portion of the first flow path 132 (that is the level of d1 gradually increases over the level of d2).

The reason is that the flow path of the first flow path 132 of the first passage body 110 is larger as the first flow path 132 approaches adjacent to the inlet 112, and smaller as the first flow path 132 approaches adjacent to the delayed discharge outlet 114. In addition, the size change of the flow path is smaller as the first flow path 132 approaches adjacent to the inlet 112, and larger as the first flow path 132 approaches adjacent to the delayed discharge outlet 114. That is, the first flow path 132 is wider in the upper flow path and narrower towards the bottom. In addition, the size of the first flow path 132 changes relatively gently at the upper portion, but the size of the first flow path 132 decreases rapidly toward the lower side adjacent to the delayed discharge outlet 114. The above changes in the flow path size of the first flow path 132 causes the water level to gradually increase as the water to be refilled approaches the full water level. Thus, when a certain amount of water is supplied per hour, the rate at which the water rises from the bottom of the first passage 132 to the top becomes slow. This may give the user the time to recognize that the near full water level is being reached.

The first passage body 110 and the second passage body 120 may be provided to be separable from the body 10, respectively. The outlet 122 of the second passage body 120 protrudes forward and the outlet 122 may be inserted into the inlet passage 214 of the water tank 200. The combining of the second passage body 120 to the water tank 200 may be achieved by inserting the protruding portion of the outlet 122 into the inlet passage 214 of the water tank 200 along the protruding direction of the outlet 122.

The first passage body 110 may be placed on top of the second passage body 120. The first passage body 110 and the second passage body 120 may be provided so as to correspond to shapes such as (凸) and (凹) which affix to each other. Thus, after the second passage body 120 is fixed to the water tank 200, the first passage body 110 is placed on the upper portion of the second passage body 120 and may be coupled together by a combination of portions formed with (凸) and (凹) shapes on the respective first passage body 110 and second passage body 120.

The first passage body 110 and the second passage body 120 may be drawn out of the body 10 in the open state of the top plate 12 to be separated. In addition, the configuration of the first passage body 110 and the second passage body 120 may be combined again in the reverse order of disassembly in the open state of the top plate 12. Thus, although the water supply passage 130 may have a relatively complex configuration formed inside the water supply part 100, the water supply part 100 may be easily disassembled making it possible to be washed, for example.

Figure 17:
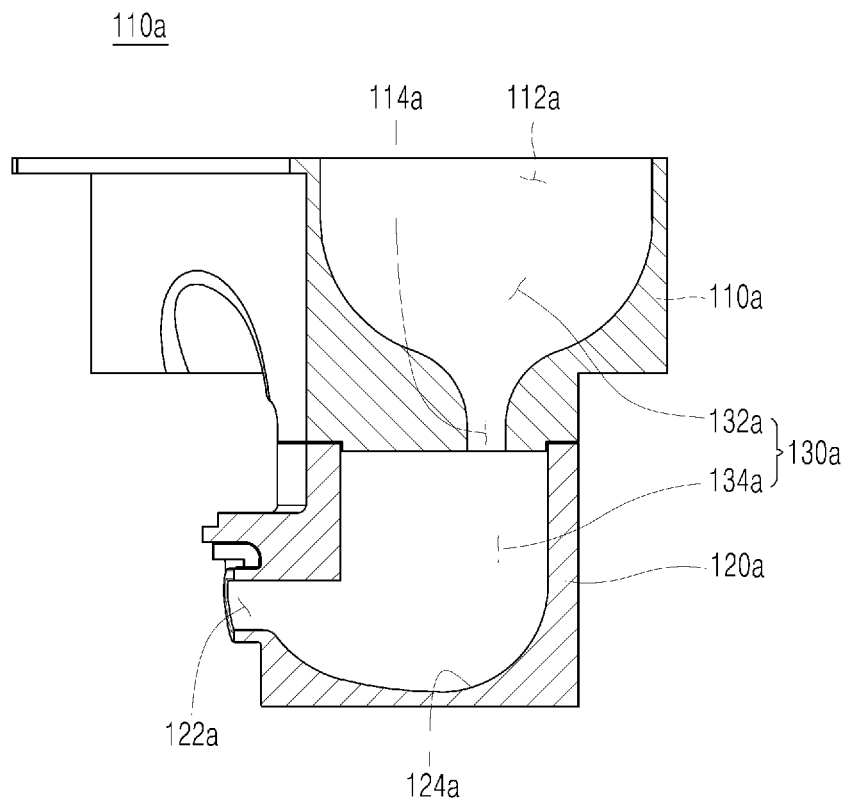
FIG. 17 is a partial cross-sectional view showing a water supply part in a hydrogen water generator according to another embodiment of the present invention.

FIG. 17 is a partial cross-sectional view showing a water supply part in a hydrogen water generator according to another embodiment of the present invention.

As shown in FIG. 17, a flow guide surface 124a is formed inside a second passage body 120a. The flow guide surface 124a is provided on a second flow path 134a and may be located vertically below a delayed discharge outlet 114a. The flow guide surface 124a may be provided with a portion that is at least partially recessed such that that recessed portion is lower than the outlet 122a which is the outlet of the second flow path 134a. Here, the lowest point of the recessed portion included in the flow guide surface 124a may be located between the delayed discharge outlet 114a and the outlet 122a based on the horizontal direction. Thus, the water that falls downward through the delayed discharge port 114a is changed in the direction of travel along the curved surface of the flow guide surface 124a. In addition, water moving along the recessed portion of the flow guide surface 124a may form vortices which may disperse kinetic energy more efficiently, for example.

Figure 18:
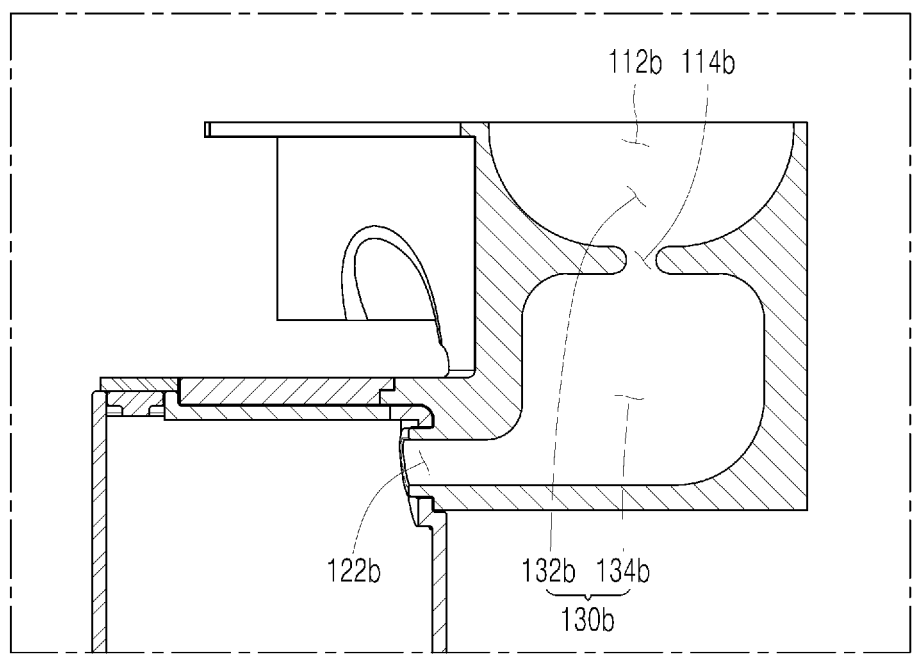
FIG. 18 is a partial cross-sectional view showing a water supply part in a hydrogen water generator according to another embodiment of the present invention.

FIG. 18 is a partial cross-sectional view showing a water supply part in a hydrogen water generator according to another embodiment of the present invention.

As shown in FIG. 18, In water supply part 100b, the first passage body 110 and the second passage body 120 may be integrally formed as a single piece. A water supply passage 130b is formed inside the water supply part 100b. A delayed discharge outlet 114b, which is a section in which the flow path is narrowed, is provided at the top portion of a second flow path 134b.

The upper portion of the delayed discharge outlet 114b gradually widens its flow path, and an inlet 112b is formed on the upper surface thereof which is open upward. The water passing through the delayed discharge port 114b moves from up to down direction (a vertical direction), and the inner surface of the water supply passage 130b located vertically below the delayed discharge port 114b is a flow guide surface 124b made of a curve surface toward the outlet 122b. The outlet 122b is opened to one side at the lower end of the water supply part 100b so that water may flow in the horizontal direction.

As described above, the hydrogen water generator 1000 according to the embodiments may reduce physical impact that may be applied to the hydrogen water contained in the water tank 200 when water is supplied. This may be achieved by allowing all of the water introduced into the water tank 200 to pass through the water supply part 100. The water supply part 100 includes a delayed discharge outlet 114 and an outlet 122. The water passing through the delayed discharge outlet 114 may have a constant flow rate, but the flow rate may be decreased at the time when the water passes through the outlet 122. Due to the shape of the outlet 122, the water flowing into the water tank 200 may flow along one side (side wall) of the water tank 200. Therefore, even when water replenishment is carried out in the water tank 200 containing hydrogen water, escape of hydrogen from hydrogen water may be prevented. As a result, the hydrogen water generator 1000 according to the embodiments may enable generating and storing water having a relatively high concentration of hydrogen dissolved in the water.

The water supply passage 130 may be wider toward the upper portion of the first flow path, so that the user may easily recognize that the full water level is near when replenishing water. As the water level rises, the water level rises slowly, thus providing the user with sufficient time to stop replenishing water so that the water does not overflow.

While a water supply passage 130 having a complicated shape may be formed inside the water supply part 100, the water supply part 100 may be divided into the first passage body 110 and the second passage body 120, which are easily separable from the body 10. This may make it possible to conveniently wash the water supply part 100.

While preferred embodiments of the present invention have been described above with reference to the drawings, the present invention is not limited to the above-described embodiments, and it is apparent to those skilled in the art that the embodiments of the present invention may be modified without departing from the spirit and scope of the present invention. It will be understood that modifications and variations are possible. Therefore, the scope of the present invention should not be defined by the described embodiments, but should be determined by the technical spirit described in the claims.

What is claimed is:

1. A hydrogen water generator comprising:
a water supply part including a water supply passage including an inlet and an outlet;
a water tank coupled to the outlet for receiving and storing water supplied to the inlet;
an electrode module coupled to the water tank for generating hydrogen to generate hydrogen water in the water tank; and
a water outlet for discharging the hydrogen water stored in the water tank, wherein
the water supply passage includes a delayed discharge outlet which is a portion of the water supply passage having a smallest cross-sectional area of a flow path in the water supply passage;
wherein the water supply part further comprises:
a first passage body including a first flow path, the first passage body including the inlet at one end portion the first flow path,
a second passage body including a second flow path, the second passage body including the outlet at one end portion of the second flow path,
wherein the delayed discharge outlet is disposed at an other end portion of the first flow path of the first passage body, and an other end portion of the second flow path of the second passage body couples with the other end portion of the first flow path of the first passage body, and
a cross-sectional area of the other end portion of the second flow path is wider than the cross-sectional area of the delayed discharge outlet,
wherein the outlet is formed as an opening that opens toward one side of the water supply part and the outlet has a width in a horizontal direction longer than a height in a vertical direction.

2. The hydrogen water generator of claim 1, wherein a cross-sectional area of the first flow path of the first passage body increases going towards the inlet and decreases going towards the delayed discharge outlet.

3. The hydrogen water generator of claim 2, wherein the cross-sectional area of the first flow path of the first passage body increases slowly towards the inlet relative to a decrease in the cross-sectional area of the first flow path of the first passage body towards the delayed discharge outlet, and
the cross-sectional area of the first flow path of the first passage body decreases rapidly towards the delayed discharge outlet relative to the increase in the cross-sectional area of the first flow path of the first passage body towards the inlet.

4. The hydrogen water generator of claim 1, wherein a portion of the water supply passage is bent such that the water from the inlet of the water supply passage changes in direction to flow to the outlet of the water supply passage.

5. The hydrogen water generator of claim 1, wherein the second passage body includes a flow guide surface that is curved and disposed at a surface of the second flow path of the second passage body where the water flowing from the delayed discharge outlet falls on.

6. The hydrogen water generator of claim 5, wherein the flow guide surface of the second passage body changes a flow direction of the water flowing in the second flow path of the second passage body with respect to the flow of the water from the delayed discharge outlet such that the water flows at least equal to or greater than a right angle.

7. The hydrogen water generator of claim 1, wherein at least one of cross-sectional area of the delayed discharge outlet, the length of the outlet in the traverse direction, and the length of the outlet in the longitudinal direction is dimensioned such that the water flowing out of the outlet flows along a wall surface of the water tank.

8. The hydrogen water generator of claim 1, wherein the water supply part including the first passage body and the second passage body is removably coupled to the water tank so that the water supply part is removable from the hydrogen water generator.

9. A hydrogen water generator comprising:
a water supply part including a water supply passage including an inlet and an outlet;
a water tank coupled to the outlet for receiving and storing water supplied to the inlet;
an electrode module coupled to the water tank for generating hydrogen to generate hydrogen water in the water tank; and
a water outlet for discharging the hydrogen water stored in the water tank,
wherein a portion of the water supply passage is bent such that the water from the inlet changes in direction to flow to the outlet,
wherein the outlet is formed as an opening that opens toward one side of the water supply part and the outlet has a width in a horizontal direction longer than a height in a vertical direction.

10. The hydrogen water generator of claim 9, wherein the water supply part further comprises:
a first passage body including a first flow path, the first passage body including the inlet at one end portion of the first flow path,
a second passage body including a second flow path, the second passage body including the outlet at one end portion of the second flow path, wherein
an other end portion of the first flow path of the first passage body couples with an other end portion of the second flow path of the second passage body, and the portion of the water supply passage that is bent is a flow guide surface of the second flow path of the second passage body where the water flowing from the other end portion of the first flow path of the first passage body falls on.

11. The hydrogen water generator of claim 10, wherein the flow guide surface is curved such that a height of the curve is progressively reduced going towards the outlet.

12. The hydrogen water generator of claim 11, wherein a delayed discharge outlet is disposed at the other end portion of the first flow path of the first passage body, the delayed discharge outlet having a smallest cross-sectional area of a flow path in the water supply passage.

13. The hydrogen water generator of claim 12, wherein the flow guide surface is disposed at a surface of the second flow path of the second passage body where the water flowing from the delayed discharge outlet falls on.

14. The hydrogen water generator of claim 13, wherein the flow guide surface changes a flow direction of the water flowing in the second flow path of the second passage body with respect to the flow of the water from the delayed discharge outlet such that the water flows at least equal to or greater than a right angle.

15. The hydrogen water generator of claim 9, wherein at least one of cross-sectional area of the delayed discharge outlet, the length of the outlet in the traverse direction, and the length of the outlet in the longitudinal direction is dimensioned such that the water flowing out of the outlet flows along a wall surface of the water tank.

16. The hydrogen water generator of claim 15, wherein the water supply part including the first passage body and the second passage body is removably coupled to the water tank so that the water supply part is removable from the hydrogen water generator.

17. A hydrogen water generator comprising:
a body;
a water supply part including
    a first passage body including a first flow path, the first passage body including an inlet at one end portion the first flow path, the inlet opening toward a upper side of the body,
    a second passage body including a second flow path, the second passage body including an outlet at one end portion of the second flow path, the outlet disposed at a lower position than the inlet,
    a delayed discharge outlet at an other end portion of the first flow path of the first passage body, and an other end portion of the second flow path of the second passage body couples with the other end portion of the first flow path of the first passage body, wherein a cross-sectional area of the other end portion of the second flow path of the second passage body is wider than a cross-sectional area of the delayed discharge outlet,
    a flow guide surface is disposed at a surface of the second flow path of the second passage body where the water flowing from the delayed discharge outlet falls on, the flow guide surface changes a flow direction of the water flowing in the second flow path of the second passage body with respect to the flow of the water from the delayed discharge outlet;
a water tank coupled to the outlet for receiving and storing water supplied to the inlet;
an electrode module coupled to the water tank for generating hydrogen to generate hydrogen water in the water tank; and
a water outlet for discharging the hydrogen water stored in the water tank;
wherein the outlet is formed as an opening that opens toward one side of the water supply part and the outlet has a width in a horizontal direction longer than a height in a vertical direction.

* * * * *